United States Patent [19]
Muise et al.

[11] Patent Number: 5,421,138
[45] Date of Patent: Jun. 6, 1995

[54] FIELD PACKING AND COOLING PROCESS FOR FRESH PRODUCE

[75] Inventors: Herbert D. Muise, Olympia; Mark A. Stanish, Seattle, both of Wash.

[73] Assignee: Weyerhaeuser Company, Tacoma, Wash.

[21] Appl. No.: 60,149

[22] Filed: May 7, 1993

[51] Int. Cl.6 .................. A23B 4/100; B65B 63/08
[52] U.S. Cl. ........................... 53/440; 53/405; 53/432
[58] Field of Search ............. 53/440, 431, 428, 405, 53/127, 449, 447, 443, 432, 510

[56] References Cited

U.S. PATENT DOCUMENTS

| | | | |
|---|---|---|---|
| 2,124,412 | 7/1938 | Dodge | 53/440 X |
| 4,168,597 | 9/1979 | Cayton | 53/127 |
| 4,380,908 | 4/1983 | Crabb, Jr. | 53/440 X |
| 5,161,693 | 11/1992 | Friman | 53/440 X |
| 5,290,580 | 3/1994 | Floyd et al. | 53/127 |

*Primary Examiner*—James F. Coan

[57] ABSTRACT

A process for packing, cooling and shipping fresh produce incorporates a standard corrugated paperboard, stackable container without utilizing any water resistant chemical compounds, together with a moisture-impervious plastic bag which is inserted into the paperboard container. The free ends of the plastic bag extend upwardly and above the top plane of the paperboard container as produce is packed and thereafter allows an opening for a preselected amount of free water to be applied over the fresh-packed produce. Thereafter, the top of the bag is tucked in providing a loose closure and the package is palletized and inserted into a vacuum chamber where the temperature of the produce is rapidly brought down to its storage and shipping temperature.

6 Claims, 2 Drawing Sheets

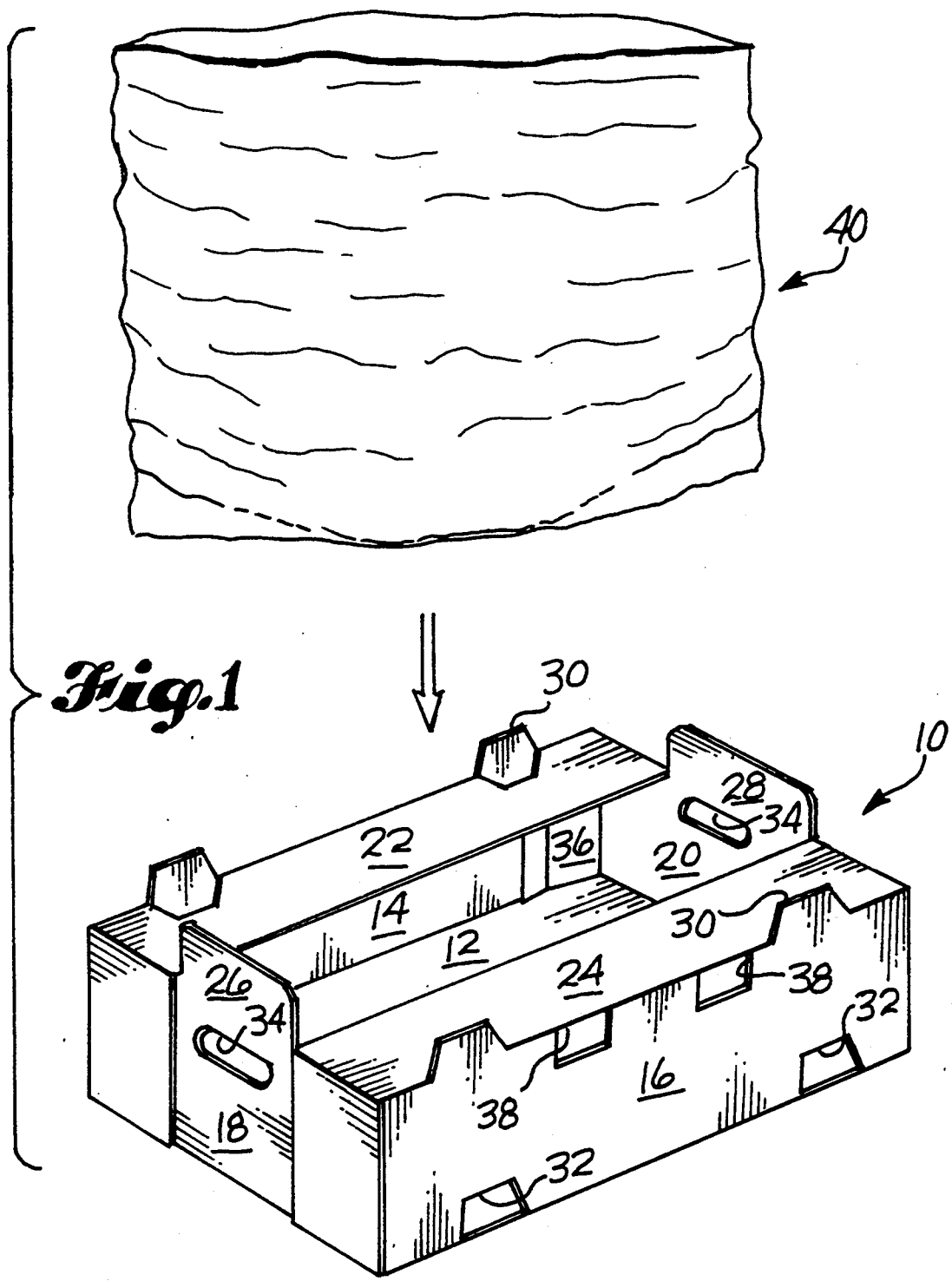

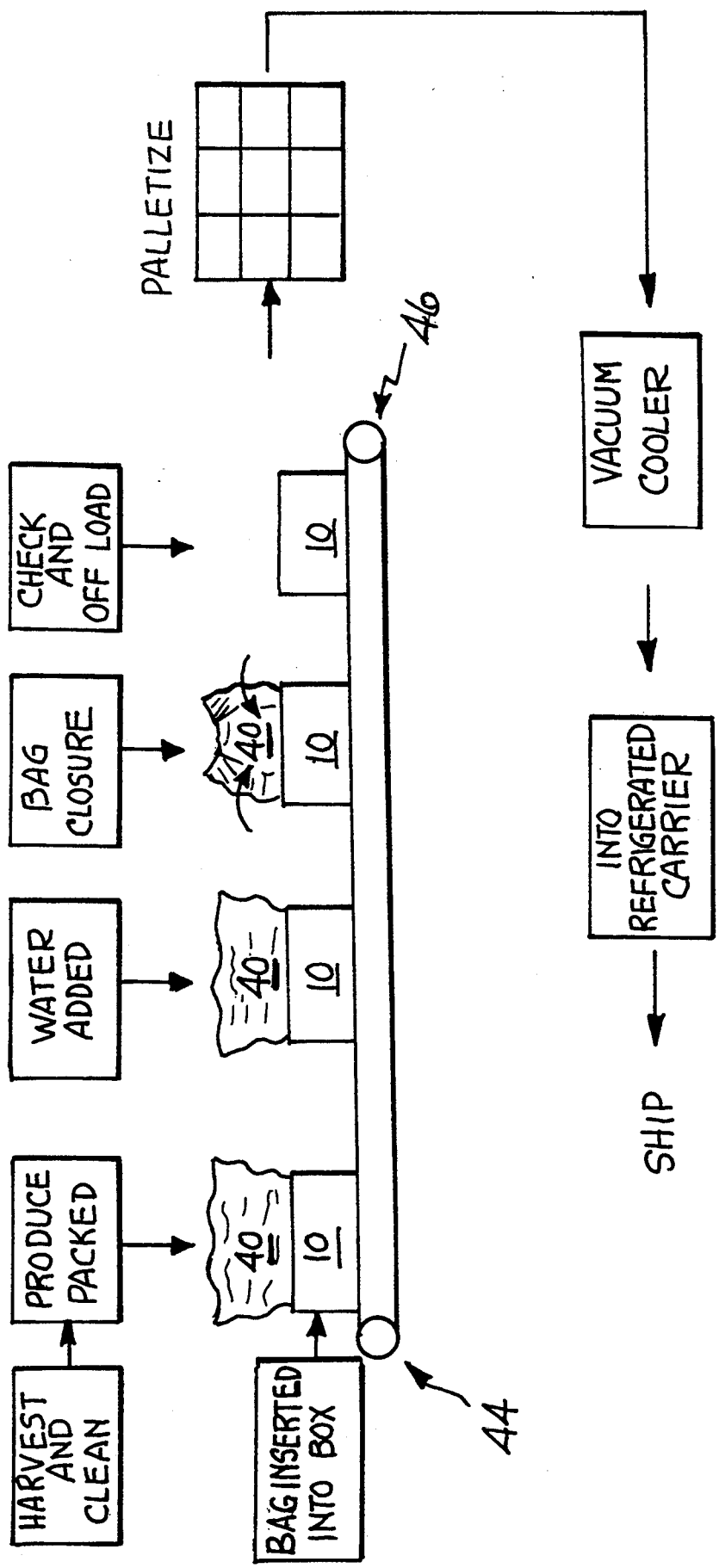

FIELD PACKING AND COOLING PROCESS FOR FRESH PRODUCE

BACKGROUND OF THE INVENTION

The present invention relates to a process for harvesting, packing, cooling and subsequently transporting fresh produce, and more particularly, to a process which does not require shipping containers to be coated or impregnated with a wax compound. The present invention provides a cold, wet environment without a fresh produce container, rather than having the container held in a wet, cold environment.

Many methods are in use today for harvesting, packing, cooling and transporting produce. Typically produce is picked from fields when the ambient temperature is above 60° and oftentimes much hotter, such as in the 80s and 90s. Once the product is picked, it must be quickly packaged and often transported over long distances with a significant time period until ultimate marketing. It is a requirement that the produce be cooled and remain in a cooled state throughout the transportation process. Cooling is done to retard degradation of the product, the ultimate consumer, of course wishing to purchase fresh, wholesome produce. Typical cooling processes include hydrocooling, vacuum cooling, icing and forced air refrigeration. A typical state-of-the-art process for harvesting and packing broccoli, and the like would include having a ready supply of wax-impregnated shipping containers (produced from corrugated paperboard) in the field and as the broccoli is harvested, it is immediately placed in a shipping container. Thereafter the containers are iced, meaning the open volume within the packed container is filled with ice. These iced containers are then palletized and refrigerated to maintain the temperature of the fresh produce within a range of from approximately 32°-34° F. What occurs here is that as the relatively warm produce gives up its heat a fair amount of free water is formed by the melting ice. It is for this reason that in the past shipping containers made from corrugated paperboard necessarily had to be made moisture resistant, typically by saturating them with wax.

Another example is the picking, packaging and shipping of celery which usually is cooled using cold water. Large amounts of cold water are cascaded over the celery stalks after they are placed in wax-impregnated shipping containers.

Not only were these processes undesirable from the standpoint of utilizing large amounts of ice (which simply adds to shipping weight) or cold water, but they also resulted in a wax-impregnated shipping container at the receiving end which had to be disposed of properly after the shipment and use. Today as more and more shipping containers and other paper products are being recycled, it becomes essential to have paper containers that are in fact recyclable without difficulty. The fact that shipping containers contained wax made those containers difficult, if not impossible, to send through a repulping-recycling process. It has thus become highly desirable to utilize nonwax-impregnated shipping container material in the packaging and transport of fresh produce. The fundamental requirement, however, must still be met in that fresh produce as it is picked and packed and subsequently cooled must thereafter be maintained in a fresh and marketable condition. If a shipping container is utilized which does not have objectionable moisture resistant compounds, such as the wax, it cannot then be subjected to large amounts of moisture because the moisture will degradate the strength characteristics of the shipping container. It is of course critical to retain the strength characteristics as a plurality of packed shipping containers are normally stacked in palletized form prior to shipment. During shipment, unloading and distribution, the containers must maintain their structural rigidity. Therefore, when using nonwaxed containers, it becomes essential to eliminate the use of ice or large amounts of cooling water to cool the fresh produce after packing.

The present invention provides a packaging system whereby objectionable compounds such as wax can be eliminated from the shipping container and where ice or large volumes of cold water are not required for use in cooling. In addition, the pressent process utilizes a vacuum cooling step where the relatively high field temperatures are reduced down to an acceptable temperature range very quickly compared to some prior vacuum cooling steps utilized in known prior art processes.

Accordingly, from the foregoing, one object of the present invention is to eliminate the use of objectionable compounds within the shipping container so that the container is repulpable-recyclable.

Yet another object of the present invention is to reduce the overall time period for cooling selected fresh picked produce from its field temperature down to its desired transport temperature and to eliminate the use of heavy ice during transport.

Still a further object is to provide the appropriate environment for the product after packing and during shipment without reducing the performing strengths of the shipping container.

Yet another object of this invention is to provide a harvesting, packing, cooling and transport process for fresh produce which is cost effective and results in the arrival of harvest fresh product ready for consumption.

These and many additional objects will be better understood by reading the specification to follow in conjunction with the attached drawings.

SUMMARY OF THE INVENTION

Briefly stated the present invention is practiced by providing a corrugated paperboard shipping container without wax or other objectionable compounds therein and with sufficient stacking strength for palletizing with an open top. An open unvented, thin, flexible plastic bag is placed within the shipping container and thereafter it is filled with fresh picked produce in the field. Substantially simultaneously with the filling of the plastic bag sitting within the shipping container a predetermined amount of water is sprayed over the fresh picked and packed produce. Soon thereafter the tops of the unvented bags are folded and loosely closed. A plurality of thusly packed shipping containers are then palletized and loaded into a vacuum cooling chamber where the temperature of the produce is brought down to its temperature range for shipment and subsequently handling which will normally be within a range of 32°-34° F. Since the plastic bags are not completely sealed from the atmosphere, the free liquid sprayed onto the produce will begin to evaporate and effectly reduce the temperature of the produce down to its desired range. This method of cooling is well known. However, in utilizing the cooling method with the additional water sprayed over the produce and not the container, the temperature of the produce can be reduced in a relatively short period of time with minimum dehydration of the product. Once the vacuum chamber reduces the temperature of the produce to its shipping temperature, the palletized stacks of packaged produce will then be loaded into refrigerated containers for transportation to selected destinations. By maintaining the environment within the box, this packing, cooling and shipping process has been found to yield superior produce when being marketed which is still fresh and wholesome after transport and storage times well beyond that currently experienced.

BRIEF DESCRIPTION OF THE DRAWINGS

FIG. 1 is a perspective view showing a typical corrugated paperboard box and a flexible plastic bag above the box prior to insertion therein.

FIG. 2 is a representation in schematic form of the process forming the present invention.

DESCRIPTION OF THE PREFERRED EMBODIMENT

Referring first to FIG. 1, the typical corrugated paperboard shipping container suitable for use in the present invention is depicted generally at 10. Container 10 is typical in that it is composed of corrugated shipping container material which is a corrugated medium overlaid with two sheets of linerboard. Corrugated paperboard is produced in a well known in-line process and thereafter the corrugated paperboard material is cut, scored and folded to form containers with various structures. In some cases as the containers are folded into their erected configuration, they will be glued in order to hold their final shape.

Typically, when harvesting, packing and shipping fresh produce, corrugated paper packaging materials are often the material of choice for the container. Corrugated paperboard containers provided good containment at relatively low cost and by good containment it is meant holding the particular type of produce to provide optimum transport while retaining product freshness. In addition, corrugated paperboard does provide suitable stacking strength when a plurality of such packed containers are stacked one atop another, in palletized form, for shipment.

The structure of container 10 is known and is commonly used for shipping fresh produce such as cauliflower, broccoli, and the like. Typically, it is manufactured utilizing single wall corrugated board with a wax impregnant to make it substantially moisture proof. The wax compound was necessary to waterproof the corrugated paperboard since fresh produce contains significant amounts of water and ice or additional water was normally applied to the produce for cooling purposes, thereby allowing free water to contact the paperboard. Unless the paperboard material had been treated with a waterproofing agent, water would be readily absorbed into the board and the paperboard would deteriorate over time, causing the container to lose its strength and other properties. As pointed out in the background of the invention after the fresh produce is harvested and placed within the container, the produce must be cooled from its field temperature down to a temperature usually within a range of from about 32° F. to about 34° F. which will maintain the freshness of the produce and slow further respiration and decay.

The present invention utilizes a suitable corrugated paperboard container design sized for the particular produce but one without having a wax or other chemical compound impregnated into the material which causes problems with subsequent repulping-recycling. Given the requirements of shipping fresh produce with the boxes being stacked one atop another, each of the individual containers 10 must have sufficient top-to-bottom stacking strength so they maintain their structural properties when stacked into a palletized form.

Turning now to the construction of container 10, it will be seen that it is comprised of bottom wall 12, two opposed side walls 14, 16 and two opposed end walls 18, 20. It will be fabricated from a single piece of cut and scored corrugated paperboard. A pair of opposed strap members 22, 24 extend along each side and top of container 10. A portion of each strap 22, 24 is folded over one of the top end edges and overlies a portion of its respective end wall. A central opening extends between the inner edges of straps 22, 24 and forms the opening through which the fresh-picked produce is packed and through which it may be extracted after shipment. Again, typical of this known container structure is a pair of stacking tabs 26, 28 extending upwardly from each end wall 18, 20. Similarly, along each side wall 14, 16 and extending upwardly therefrom are individual stacking tabs each indicated at 30. These stacking tabs 30 will fit within receiving slots each indicated at 32 located along the bottom edge of side walls 14, 16. Again, these are well known features utilized for stacking purposes. Hand hold apertures 34 are located in each end wall 18, 20 to allow easy pickup and handling. If necessary for vertical stacking strength and as illustrated in FIG. 1, an inclined corner panel indicated at 36 can be provided in each corner of container 10. Corner panels are well known for use in containers to provide additional stacking strength. Perforations or apertures 38 are provided within container 10 for air and gas flow during both the cooling process and throughout shipment to the destination. This particular container is of a construction whereby the folding and erection can take place in the field utilizing a series of interlocking tabs and slots (not shown). An alternative would be to machine form a substantially similar container by gluing it together and then utilizing the formed container in the present invention.

Turning now to a description of plastic bag indicated at 40 it may be seen that bag 40 has a length and width which is approximately equal to the length and width of container 10. Bag 40 is constructed of tough, flexible, water impervious plastic and could be on the order of one mil or more in thickness. While the length and width of bag 40 is approximately the length and width of container 10, its overall height will be approximately that of depth plus two widths of container 10. In the field when fresh-cut produce is ready to be packed, individual plastic bags 40 will be inserted downwardly into containers 10 where the bottom of bag 40 will then be spread out to conform to the bottom rectangular configuration of bottom wall 12. As bag 40 is manipulated into place, its side walls will move downwardly into the opening on the top but a substantial portion towards the top of bag 40 will remain exposed and above the horizontal plane of straps 22, 24. Alignment means, such as sunburst holes, can be provided in the bottom of container 10 for quickly placing bag 40 in place. What is thusly formed when the plastic bag is in its location within container 10 is a substantially water-impervious receiving bag for accepting fresh-cut produce. It is desirable that there be no perforations within the lower half of plastic bag 40 so that any free water within the produce or the free water which is added as part of the invention will be securely retained by the plastic bag.

Turning now to FIG. 2, the series of process steps forming the present invention will be described. At the beginning a plastic bag 40 is inserted into the typical shipping container 10. Again, to reiterate, the shipping container 10 is one that does not utilize any objectionable chemical additive within the corrugated paperboard which would prohibit or otherwise make repulping and recycling difficult. For purposes of illustrating a substantially continuous in-line process, a conveyor means is shown at 42 and it has an infeed end 44 and outfeed end 46. Taking place in close proximity to produce being loaded into the bottom of a container with the bag inserted therein will be the harvest and cleaning step. Of course, it is highly desirable to pack the fresh-cut produce as soon after it is harvested as is practical. As the produce is being harvested the ambient temperature is relatively high, ranging anywhere from between 60° F. to 90° F., sometimes lower and sometimes higher. With this ambient temperature, the produce temperature is relatively high and if stored would soon spoil.

When packing typical harvested row crops such as broccoli, celery, mixed green and the like, a suitably sized container and its related bag will be receiving individual pieces of produce that are inserted into the opening of the container. This is usually done by hand, although it could be done mechanically. Depending upon the weight of produce to be packed, the container is filled while the outwardly extending walls of the plastic bag remain in an open configuration. At the next step in the process, a predetermined amount of water is added to the packed produce. It is added in a suitable form such as in droplet form by being sprayed over the top surface of the produce resting in the container. The amount of water added is determined based on the weight of the packed produce and the temperature of the produce. Typically the shipping and storage temperature is to be between 32° and 34° F. When utilizing a vacuum cooling step, it is known that in order to reduce dehydration of the produce, i.e., drawing free water out of the produce, an amount of water should be added which should be approximately 1% by weight of the fresh produce for every 10° F. of needed cooling. For example, if the pulp temperature of the fresh-cut produce is 85° F. and the desired cooled temperature is 35° F., approximately 5% by weight of the packed produce should be added as free water. Care should be taken when the free water is added to avoid spraying or otherwise allowing the free water to contact the underlying container 10 keeping in mind that container 10 is regular corrugated paperboard. The objective is to spray or otherwise uniformly cover the packed produce with the predetermined amount of free water prior to it being vacuum cooled.

After the required amount of free water has been added, any excess flowing to the bottom of the plastic bag but being retained within the bag, the top neck of the bag is neatly folded over the surface of the product and tucked in beneath the edges of straps 22, 24. The top of the bag will remain loosely closed in that there is not an effective seal created tightly closing off the produce to the atmosphere.

After the bag is closed, a final check and off load of the packed produce can be made at outfeed end 46. Thereafter, a predetermined number of packed containers will be palletized in the typical manner. For example, containers filled with celery could be palletized in tiers of five, seven or eight high, while containers with broccoli could be palletized in tiers of four-2×2-ten to twelve high. These palletizing configurations are all well known to those skilled in the art.

With the fresh produce so packed and palletized, the pallets are then moved to a vacuum cooler where depending upon its capacity, the appropriate number of pallets will be inserted therein. The vacuum cooling step is, as previously mentioned, known for cooling produce. However, in the present invention as the vacuum cooling sequence is started and the pressure reduced, the free water will begin to evaporate drawing the heat out of the fresh-cut produce, thereby bringing its temperature down relatively rapidly. The water vapor is typically condensed on coils which are maintained at a temperature to yield a cooled product within the range of 32°–34° F. It has been found that when cooling relatively dense produce like celery or broccoli it takes approximately one hour to bring the temperature of the produce down to its desired range of from 32°–34° F. During this time period, approximately the amount of free water added will be evaporated allowing the produce to cool with minimum dehydration. At the end of the cooling step the vacuum should be released slowly, allowing the pressure to come back up to atmospheric over approximately a 5–10 minute period so as to not damage the produce by driving any free water back into the produce. Similarly, it has been found in leafy produce such as romaine and mixed leaf that the vacuum cooling step only takes from between 20 to 30 minutes depending upon the particular type of produce and likewise that the vacuum should be release slowly.

During storage and shipment which will be within refrigerated units, the water content of the packed produce will remain relatively stable. At the receiving end, the produce will be unpacked where it has been found to be very fresh appearing and wholesome, even after being refrigerated for long periods. Further, it has been found that after unpacking, the produce does not have to be rejuvenated by adding additional water or ice prior to marketing.

Other process variations are available, for example, when shipping to a destination where fumigation is required. If cool, fresh produce is to be shipped to Japan, for example, there may be a fumigation requirement. In this case a relatively shorter bag length is utilized leaving an open strip along the top of the produce whereby a fumigating gas will be allowed to diffuse over the fresh produce. A separate strip of plastic is applied over the open area of the bag during shipment and removed prior to fumigation.

Another option would be to provide an easily tearable perforated line around the entire circumference of the plastic bag but at a location at the top edge of the container (so as to leave bottom portion of the bag as moisture impervious) so that after receiving the produce in Japan, the top of the bag can be readily torn away exposing the produce for fumigation.

Still another option involves the use of evaporative liquids other than regular water. Liquids including additives or multifuntional liquids can be utilized to provide enhanced product performance. For example, additives such as lemon juice could be utilized to minimize browning and odor control additives may be utilized.

While a detailed description has been provided of the preferred embodiment and several alternatives, it may occur to those skilled in the art to make modifications and changes to the process which will nevertheless still come within the scope and spirit of the present invention. All such changes and modifications are intended to be included within the scope of the appended claims.

We claim:

1. A process for packing and cooling fresh produce, comprising:

placing a water impermeable plastic bag within a shipping container, placing at least one piece of fresh picked produce within the plastic bag, adding a predetermined amount of evaporative liquid to the produce within the bag and thereafter loosely closing the bag, and placing the closed bag within the shipping container in a vacuum cooling chamber and cooling the produce to a predetermined temperature.

2. A process as in claim 1 further including removing the cooled packed produce from the chamber and thereafter shipping the cooled produce.

3. A process as in claim 1 in which the liquid is water.

4. A process as in claim 3 in which the liquid is water with additives.

5. A process as in claim 3 in which the amount of liquid added is approximately 1% by weight of fresh produce for every 10° F. of needed cooling.

6. A process as in claim 1 further including stacking a plurality of containers packed with the bagged wet produce prior to placing the stacked containers in the cooling chamber.

* * * * *